(12) United States Patent
Kato et al.

(10) Patent No.: US 8,511,631 B2
(45) Date of Patent: Aug. 20, 2013

(54) ASSEMBLING STRUCTURE OF CLIP AND MOUNTING MEMBER

(75) Inventors: Kouichi Kato, Kanagawa (JP); Nobuya Shinozaki, Kanagawa (JP); Hiroshi Nakazato, Kanagawa (JP)

(73) Assignee: Piolax, Inc., Yokohama-Shi, Kanagawa (JP)

( * ) Notice: Subject to any disclaimer, the term of this patent is extended or adjusted under 35 U.S.C. 154(b) by 343 days.

(21) Appl. No.: 12/379,168

(22) Filed: Feb. 13, 2009

(65) Prior Publication Data
US 2009/0218464 A1    Sep. 3, 2009

(30) Foreign Application Priority Data

Feb. 28, 2008  (JP) ................ P2008-048285

(51) Int. Cl.
*A47G 1/10* (2006.01)
*A44B 11/25* (2006.01)
*A44B 17/00* (2006.01)

(52) U.S. Cl.
USPC ............................. 248/316.7; 24/297; 24/702

(58) Field of Classification Search
USPC .............. 248/55, 71, 69, 316.7; 24/297, 456, 24/702; 411/104
See application file for complete search history.

(56) References Cited

U.S. PATENT DOCUMENTS

| | | | | |
|---|---|---|---|---|
| 4,568,215 A | * | 2/1986 | Nelson | 403/13 |
| 5,217,337 A | * | 6/1993 | Junemann et al. | 411/45 |
| 5,319,839 A | * | 6/1994 | Shimajiri | 24/453 |
| 5,531,499 A | * | 7/1996 | Vecchio et al. | 296/146.7 |
| 5,689,863 A | * | 11/1997 | Sinozaki | 24/297 |
| 5,704,753 A | * | 1/1998 | Ueno | 411/509 |
| 6,514,024 B2 | * | 2/2003 | Akema et al. | 411/48 |
| 6,565,116 B1 | * | 5/2003 | Tajima et al. | 280/730.2 |
| 6,572,317 B2 | | 6/2003 | Okada et al. | |
| 6,594,870 B1 | * | 7/2003 | Lambrecht et al. | 24/297 |

(Continued)

FOREIGN PATENT DOCUMENTS

| | | |
|---|---|---|
| JP | 62-044120 U | 3/1987 |
| JP | 62105741 A * | 5/1987 |

(Continued)

OTHER PUBLICATIONS

Machine translatiion of Kamiya et al., JP2001041215, Feb. 13, 2001.*
Japanese Office Action issued Oct. 25, 2011 with an English translation thereof.

*Primary Examiner* — Joshua J Michener
*Assistant Examiner* — Chiedu Chibogu
(74) *Attorney, Agent, or Firm* — McGinn IP Law Group, PLLC

(57) ABSTRACT

According to an aspect of the present invention, there is provided an assembling structure including: a mounting member having a mounting seat; and a clip having a head and a leg. The head includes: a neck portion; and first and second flanges outwardly protrudes therefrom to sandwich the mounting seat therebetween, wherein the mounting seat includes: a hole having a diameter larger than that of the neck portion; a groove formed to communicate the hole with outside the mounting seat; and a projection protruding from a peripheral edge of the hole, wherein the second flange includes: an inner face radially-outwardly extending therefrom to gradually come close to the first flange; a top portion; and an outer face further extending to gradually separate from the first flange, and wherein the inner face abuts the projection in an assembled state.

17 Claims, 8 Drawing Sheets

(56) References Cited

U.S. PATENT DOCUMENTS

| | | | |
|---|---|---|---|
| 6,772,484 B2 * | 8/2004 | Miyano et al. | 24/297 |
| 6,796,760 B1 * | 9/2004 | Tanner | 411/107 |
| 7,114,221 B2 * | 10/2006 | Gibbons et al. | 24/289 |
| 7,178,855 B2 * | 2/2007 | Catron et al. | 296/146.7 |
| 7,927,050 B2 * | 4/2011 | Koike | 411/104 |
| 2004/0083583 A1 * | 5/2004 | Bradley et al. | 24/297 |
| 2008/0298890 A1 * | 12/2008 | Koike | 403/408.1 |

FOREIGN PATENT DOCUMENTS

| | | | |
|---|---|---|---|
| JP | 10-009236 A | | 1/1998 |
| JP | 2001-041215 | | 2/2001 |
| JP | 2001041215 A | * | 2/2001 |
| JP | 2002-174212 A | | 6/2002 |
| JP | 2004-293626 A | | 10/2004 |

* cited by examiner

ASSEMBLING STRUCTURE OF CLIP AND MOUNTING MEMBER

CROSS-REFERENCE TO RELATED APPLICATIONS

This application claims priority from Japanese Patent Application No. 2008-048285 filed on Feb. 28, 2008, the entire contents of which are incorporated herein by reference.

BACKGROUND OF THE INVENTION

1. Field of the Invention

An aspect of the present invention relates to an assembling structure of a clip and a mounting member, wherein the clip fixes the mounting member to a member on which the mounting member is to be mounted.

2. Description of the Related Art

For example, to fix a mounting member such as a trim board to a mounted-side member such as a vehicle body panel of an automobile, a clip having a head portion and a leg portion is used. In this case, a hood-like mounting seat, to which the head portion of the clip is assembled, is formed in the mounting member. The head portion of the clip is assembled to the mounting seat and the leg portion is inserted into a mounting hole of the member on which the mounting member is to be mounted. In this way, the mounting member is fixed to the mounted-side member through the clip.

Usually, the mounting member includes a plurality of mounting seats. The clip is assembled to each mounting seat and a leg portion of each clip is inserted and fixed into the corresponding mounting hole of the mounted-side member. Each clip is assembled to have a play with respect to the mounting seat in order to align the leg portion of each clip with the corresponding mounting hole even when a small amount of an unavoidable manufacturing dimensional error is generated between the mounting member and the mounted-side member.

However, when the plural clips are respectively variously deviated in their play ranges, it is difficult to simultaneously position the leg portions of the clips so as to be inserted into the corresponding mounting holes. Accordingly, the working property is deteriorated.

JP-2001-041215-A discloses an assembling structure of a clip and a mounting member in which the clip includes an assembling portion in the base end portion, the mounting member includes an assembling pedestal on the mounting face, the assembling portion includes two flanges (plate bodies) and a shaft to connect the two flanges at the centers in parallel with each other, and the assembling pedestal is formed into a hollow shape having a bearing surface in the upper portion. The assembling pedestal includes: an opening on a side thereof; an open hole portion formed at a substantially central portion of the bearing surface to have a diameter larger than the outer diameter of the shaft of the clip; an introducing passage communicating from the open hole portion to the opening on the side; and a convex peripheral portion formed concentrically with the open hole portion on the bearing surface.

In this clip, when the shaft of the clip is inserted into the open hole portion through the introducing passage, the bearing surface of the assembling pedestal is interposed between the two flanges of the clip, so that the clip can be assembled to the mounting member. In a state where the clip is assembled to the assembling pedestal, an outer circumferential portion of one of the flanges of the clip elastically pressingly abuts the convex peripheral portion provided in the assembling pedestal and is pushed upward. When the clip is not-coaxial with the center of the open hole portion of the pedestal, an outer circumference of one of the flanges is pushed by the convex peripheral portion and a returning force toward the center of the open hole portion is given by the elastic force of the flange. As a result, when no external force is given, the clip is held at a position close to the center of the open hole portion.

However, in the structure described in JP-2001-041215-A, the clip is assembled to the assembling pedestal in a state where one of the flanges of the clip is pushed upward by the convex peripheral portion on the assembling pedestal side. Therefore, there is a possibility that the flange is permanently deformed with age and the elastic force of the flange is lowered and a centering action of the clip is deteriorated.

SUMMARY OF THE INVENTION

An object of the present invention is to provide an assembling structure of a clip and a mounting member capable of holding the clip at a given position with respect to a mounting seat by suppressing a permanent deformation of a flange portion of the clip and maintaining an elastic force of the flange portion.

According to an aspect of the present invention, there is provided an assembling structure including: a mounting member including: a mounting seat that is formed in a plate-like shape; and a clip including: a head portion that is to be inserted into the mounting seat; and a leg portion that extends from one surface of the head portion and that is to be inserted into a mounted-side member, wherein the head portion includes: a neck portion that is to be inserted into the mounting seat; a first flange portion that outwardly protrudes from an upper-side circumference of the neck portion so that a lower face thereof abuts the mounting seat; and a second flange portion that outwardly protrudes from a lower-side circumference of the neck portion so that an upper face thereof abuts the mounting seat, wherein the mounting seat includes: an enlarged-diameter hole that has an inner diameter larger than an outer diameter of the neck portion; an introducing groove formed to communicate the enlarged-diameter hole with an outer peripheral of the mounting seat; and an inner projection that is formed to protrude from a peripheral edge of the enlarged-diameter hole, wherein the upper face of the second flange portion includes: a first tapered face that radially-outwardly extends from the neck portion and is inclined to gradually come close to the first flange portion; a top portion that is continuous with the first tapered face and is closest to the first flange portion; and a second tapered face that radially-outwardly extends from the top portion and is inclined to gradually separate from the first flange portion, and wherein the first tapered face abuts the inner projection in an assembled state in which the clip is assembled on the mounting seat.

According to such configuration, when the neck portion of the clip is introduced through the introducing groove of the mounting seat and inserted into the enlarged-diameter hole, the mounting seat is interposed between the first and the second flange portion and the inner projection of the mounting seat abuts the flange radial-inner face of the second flange portion.

When the neck portion of the clip is not-coaxial with respect to the center of the enlarged-diameter hole of the mounting seat, the inner projection of the mounting seat is strongly pushed by the flange radial-inner face on the opposite side to the eccentric direction. Therefore, a pushing force to push the clip in the opposite direction to the eccentric direction is given by an elastic force of the flange radial-inner face. This force becomes a centering force to move the clip to the center of the enlarged-diameter hole of the mounting seat, so that the clip can be arranged at the center of the enlarged-diameter hole.

Therefore, in the case where the mounting seats are arranged at a plurality of portions of the mounting member and the clip is mounted at each mounting seat, it is possible to arrange each clip at the center of the enlarged-diameter hole of the mounting seat. When the leg portions of the respective clips are inserted into the corresponding mounting holes of the mounted-side member, the leg portions can be easily positioned to the mounting holes. Accordingly, the working property of mounting can be enhanced.

Even in the case where the clip is stored in a state where the clip is mounted on the mounting seat of the mounting member before the clip is attached to the mounted-side member, the clip is arranged at the center of the enlarged-diameter hole of the mounting seat and the inner projection of the mounting seat only abuts the flange radial-inner face of the second flange portion. Therefore, the deformation of two flange portions can be suppressed to the minimum, that is, a permanent deformation is seldom caused. Accordingly, there is no possibility that the centering force described before is lowered at the time of mounting the clip on the mounted-side member.

In this connection, in the case where the clip are respectively mounted on the mounting seats arranged at a plurality of portions of the mounting member and the leg portions of the respective clips are inserted into the corresponding mounting holes of the mounted-side member in a state where the respective clips are arranged at the centers of the enlarged-diameter holes, the leg portions of the clips may not accurately be aligned with the centers of the mounting holes due to dimensional errors caused between the mounting member and the mounted-side member, for example. In this case, the clips are allowed to be eccentrically moved in the enlarged-diameter holes resisting the centering force to be aligned with the mounting holes.

The inner projection may include a third tapered face inclined to gradually come close to the second flange portion along a radially inward direction.

According to such configuration, since the inner projection of the mounting seat abuts the flange radial-inner face of the second flange portion, the centering force can be more effectively given through an abutment of the inclination faces when the clip is not-coaxial with the enlarged-diameter hole.

In the assembled state, an inclination angle of the third tapered face against a perpendicular plane of an axial center of the clip may be larger than an inclination angle of the first tapered face against the perpendicular plane.

According to such configuration, the projection radial-inner face of the mounting seat is more steeply inclined than the flange radial-inner face of the second flange portion. Accordingly, the most protruding portion of the inner projection of the mounting seat surely abuts the flange radial-inner face of the second flange portion. Therefore, when the clip is displaced, the second flange portion of the clip is more effectively pushed by the inner projection of the mounting seat, thereby enhancing the centering force.

A relation that $R2-R1>(D2-D1)/2$ may be satisfied, where $D1$ is the outer diameter of the neck portion, $D2$ is the inner diameter of the enlarged-diameter hole, $R1$ is a distance from a center of the enlarged-diameter hole to a most protruding portion of the inner projection, and $R2$ is a distance from an axial center of the neck portion to the top portion of the second flange portion.

According to such configuration, even in the case where the clip is displaced so that the neck portion is maximally moved in the enlarged-diameter hole, the top portion of the second flange portion can be prevented from exceeding the inner projection of the mounting seat. Therefore, the flange radial-inner face of the second flange portion surely abuts the inner projection and the centering force can be surely given to the clip.

The mounting seat may further include an outer projection that is positioned radially-outward the inner projection. The outer projection may be formed to abut the second tapered face in a state where the clip is not-coaxial with a center of the enlarged-diameter hole.

According to such configuration, when the clip is not-coaxial with the center of the enlarged-diameter hole, the inner projection of the mounting seat is pushed onto the flange radial-inner face on the opposite side to the eccentric direction and the outer projection of the mounting seat is pushed onto the flange radial-outer face in the eccentric direction at the same time. Therefore, the centering force can be more enhanced by both the pushing forces and the clip can be smoothly returned to the center of the enlarged-diameter hole.

The outer projection may include a fourth tapered face inclined to gradually come close the second flange portion along a radially outward direction.

According to such configuration, when the clip is displaced in the radial direction, the flange radial-outer face, which is inclined in the same direction as that of the projection radial-outer face, abuts the projection radial-outer face. Accordingly, the centering force can be more effectively given.

In the assembled state, an inclination angle of the fourth tapered face against a perpendicular plane of an axial center of the clip may be larger than an inclination angle of the second tapered face against the perpendicular plane.

According to such configuration, the projection radial-outer face of the outer projection is more steeply inclined than the flange radial-outer face of the second flange portion. Therefore, when the clip is displaced, the outer projection surely collides with the flange radial-outer face and the clip is easily pushed back.

DETAILED DESCRIPTION OF THE EMBODIMENTS

Referring to FIGS. 1 to 6, an assembling structure of a clip and a mounting member according to an embodiment of the present invention will be explained.

Figure 6:
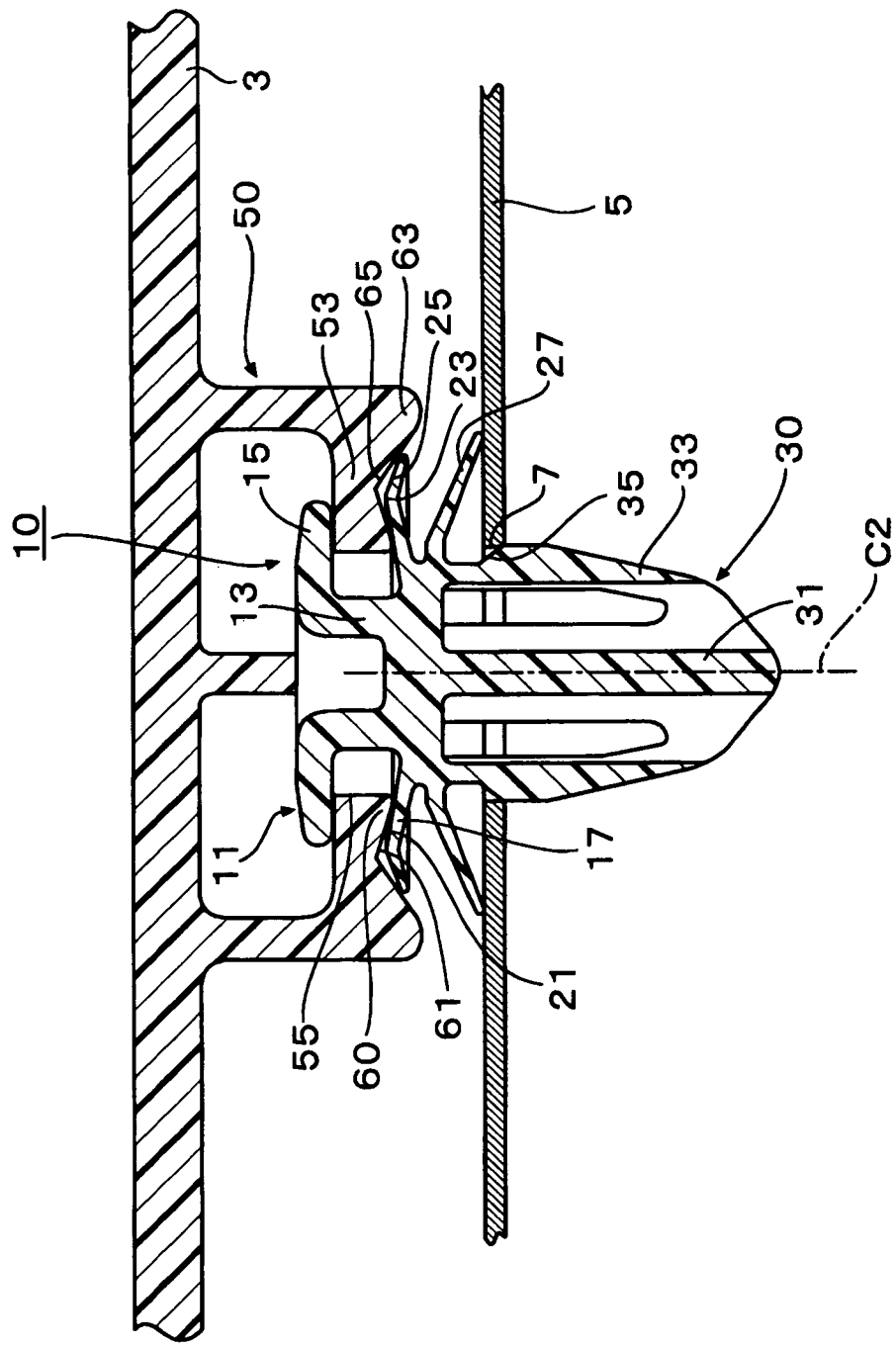
FIG. 6 is a sectional view showing a state in which a mounting member is mounted on a mounted-side member by using the assembling structure.

As shown in FIG. 6, when the mounting member 3 such as a garnish or a trim board is mounted on the mounted-side member 5 such as a vehicle body panel of an automobile, the clip 10 having a head portion 11 and a leg portion 30 is used. The head portion 11 of the clip 10 is inserted into the plate-like mounting seat 53 formed on the mounting member 3. When the leg portion 30 of the clip 10 is inserted into the mounting hole 7 formed in the mounted-side member 5, the mounting member 3 is mounted on the mounted-side member 5 through the clip 10. In the embodiment, an assembling structure of a clip and a mounting member, which will be simply referred to as an "assembling structure", relates to an assembling structure of the mounting seat 53 formed on the mounting member 3 and the clip 10.

Figure 1:
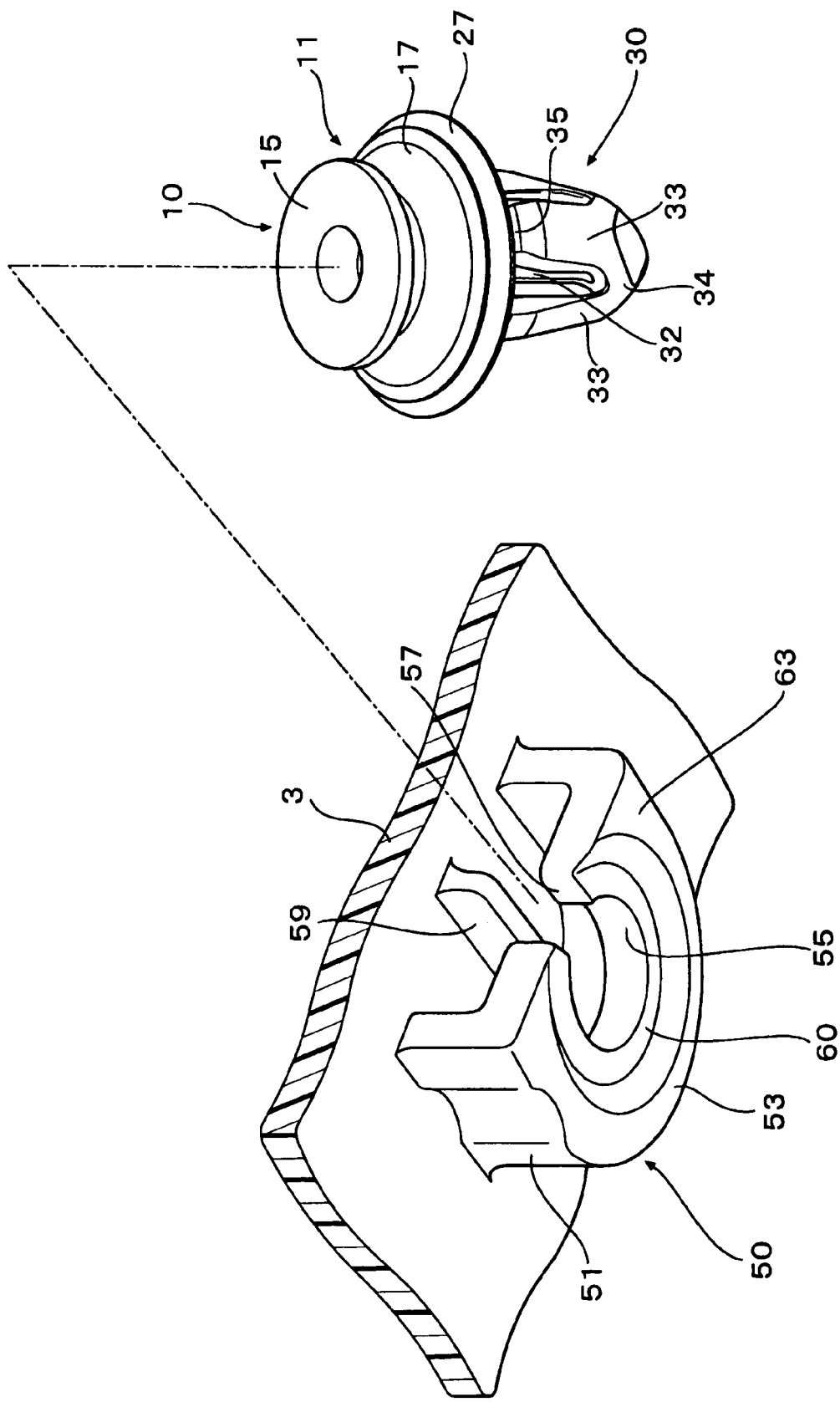
FIG. 1 is perspective view showing an assembling structure of a clip and a mounting member according to an embodiment of the present invention.

First, referring to FIGS. 1 to 3, the clip 10 will be explained. The clip 10 includes: a head portion 11; and a leg portion 30 extending from one side of the head portion 11. The head portion 11 includes: a neck portion 13 which is shaped into a hollow cylinder having a bottom; and a first flange portion 15 and a second flange portion 17 which are protruded from outer circumferences of the neck portion 13 and arranged to pinch the mounting seat 53 therebetween, the second flange portion 17 being located on the leg portion 30 side with respect to the first flange portion 15. In this embodiment, the first flange portion 15 protrudes from an outer circumference at the upper end portion of the neck portion 13 and the second flange portion 17 protrudes from an outer circumference at the intermediate portion of the neck portion 13. In a state where the clip 10 is assembled to the mounting seat 53, the plate-like mounting seat 53 is interposed between the flange portions 15, 17.

On an outer circumference at the lower end portion of the neck portion 13, a seal flange portion 27 which is provided to spread obliquely downward being formed into an umbrella-shape. In a state where the leg portion 30 is engaged with the mounting seat 7 as shown in FIG. 6, the seal flange portion 27 elastically abuts a surface-side peripheral edge of the mounting hole 7 so that the clip 10 can be prevented from rattling.

Figure 2:
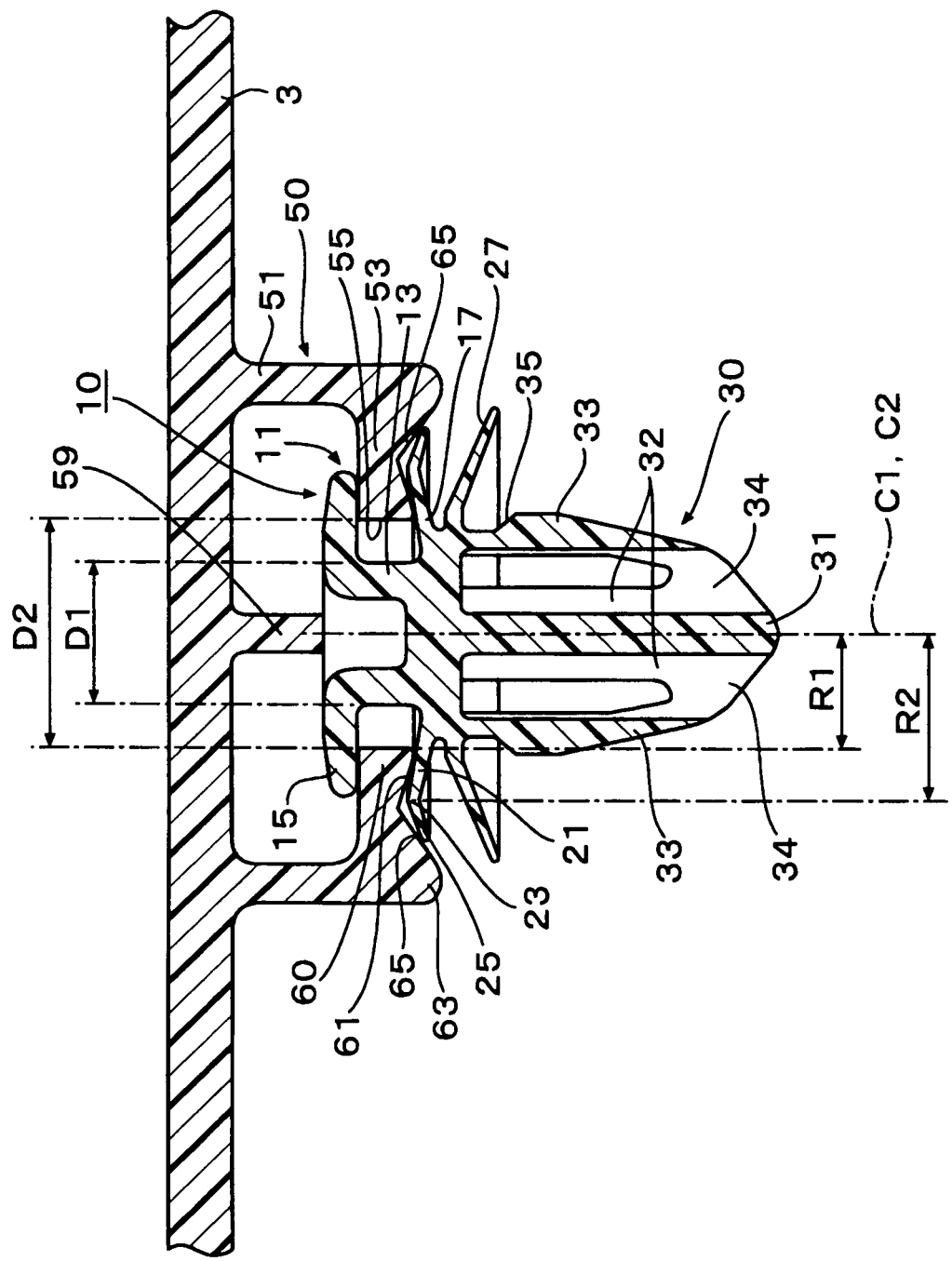
FIG. 2 is a sectional view of the assembling structure.
Figure 3:
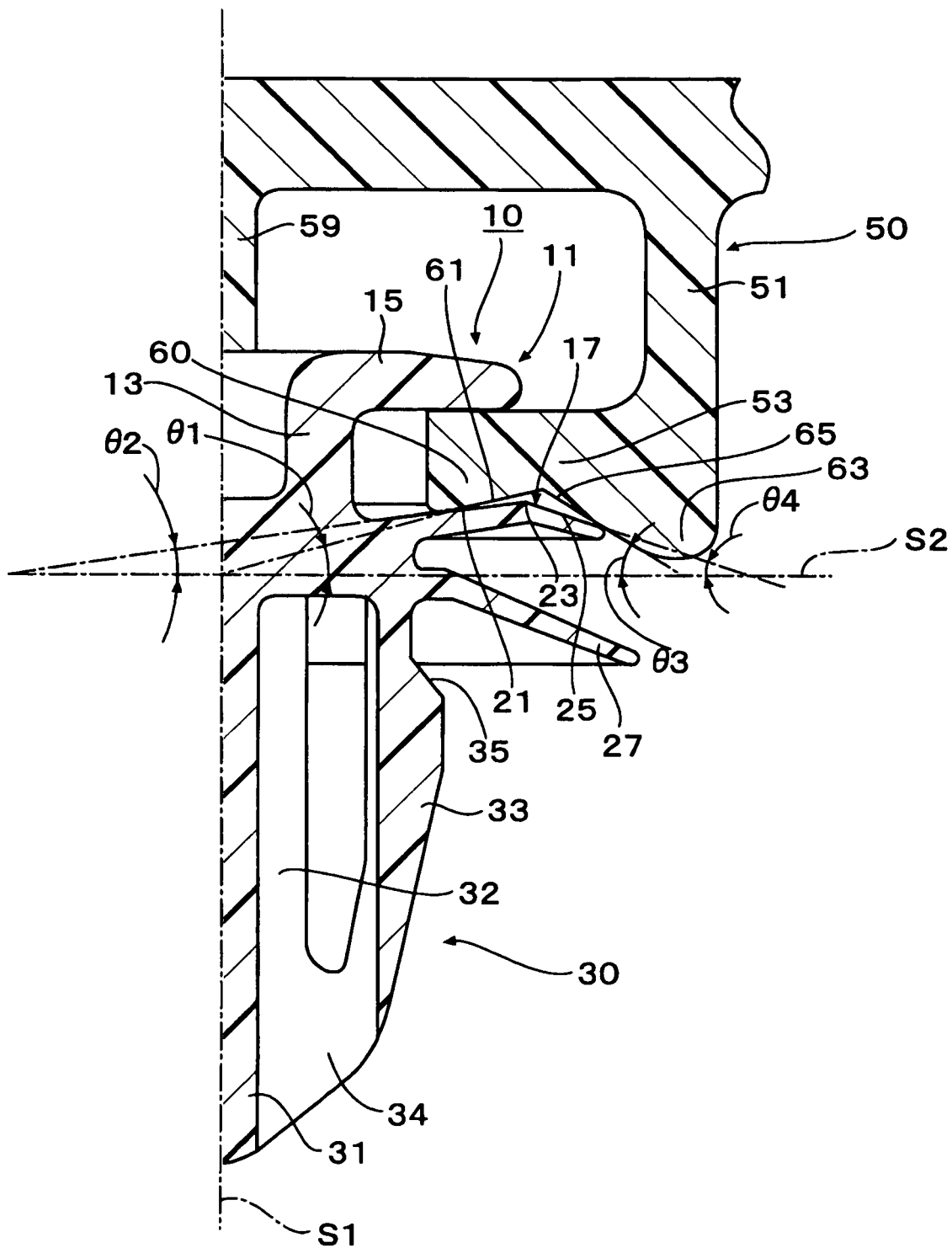
FIG. 3 is an enlarged sectional view showing one side portion of FIG. 2.

As shown in FIGS. 2 and 3, the second flange portion 17 includes a flange radial-inner face (first tapered face) 21, a top portion 23 and a flange radial-outer (second tapered face) face 25, at a surface thereof facing the first flange portion 15. The flange radial-inner face 21 radially-outwardly extends from the outer circumference of the neck portion 13 to the top portion 23 and is inclined to gradually come close to the first flange portion 15. The flange radial-outer face 25 radially-outwardly extends from the top portion 23 and is inclined to gradually separate from the first flange portion 15. The top portion 23 is positioned to be closest to the first flange portion 15.

As shown in FIG. 2, the leg portion 30 includes a shaft portion 31 which is vertically protruded from the lower face of the head portion 11. Four protruding pieces 32 are radially protruded from the shaft portion 31 in the outer diameter direction. On an outer circumference of the shaft portion 31, four engaging pieces 33 are arranged at equal intervals. A lower end portion of each engaging piece 33 is connected to the protruding piece 32 through the connecting rib 34 and an upper end portion is connected to the lower face of the head portion 11. On an upper outside of each engaging piece 33, the engagement step portion 35 is formed to be engaged with a circumferential periphery on the bottom side of the mounting hole 7 of the mounted-side member 5.

Next, the structure of the mounting pedestal 50 formed on the mounting member 3 will be explained. As shown in FIG. 1, in this embodiment, the mounting pedestal 50 having the plate-like mounting seat 53 is provided on the bottom side of the mounting member 3. A plurality of mounting pedestals 50 are usually provided in the mounting member 3 such as a garnish or a trim board and the clip 10 is assembled to each mounting pedestal 50.

The mounting pedestal 50 includes: a surrounding wall 51 which is protruded from the bottom side of the mounting member 3 and formed into a substantial U-shape so that the front side and the bottom side thereof are open; and a plate-like mounting seat 53 which is connected onto the bottom face side of the surrounding wall 51 and to be interposed between two flange portions 15, 17 of the clip 10.

The neck portion 13 of the clip 10 is inserted into the plate-like mounting seat 53 so as to be positioned at a substantial center of the plate-like mounting seat 53. At the substantial center of the plate-like mounting seat 53, an enlarged-diameter hole 55 is formed to have the inner diameter larger than the outer diameter of the neck portion 13. On the mounting seat 53, an introducing groove 57 is formed to communicate from the front side of the mounting seat 53 to the enlarged-diameter hole 55. The width of the introducing groove 57 is adjusted to be same as or slightly smaller than the outer diameter of the neck portion 13.

The head portion 11 of the clip 10 is aligned with the front opening portion of the mounting pedestal 50, and then, pushed to introduce the neck portion 13 into the introducing groove 57, thereby inserting the neck portion 13 into the enlarged-diameter hole 55. At this state, the mounting seat 53 is interposed between a pair of flange portions 15, 17. In this way, the clip 10 is assembled to the mounting seat 53. Since the diameter of the enlarged-diameter hole 55 is larger than the outer diameter of the neck portion 13, the neck portion 13 has a play amount with respect to the enlarged-diameter hole 55, and the clip 10 is enabled to move inside the mounting pedestal 50. On the other hand, since the width of the introducing groove 57 is smaller than the enlarged-diameter hole 55, the neck portion 13 is prevented from coming out through the introducing groove 57.

Inside the mounting pedestal 50, the ridge portion 59 is formed to protrude from the bottom side of the mounting member 3 and to pass through the center of the enlarged-diameter hole 55 and the center line of the introducing groove 57. By providing the ridge portion 59, when the head portion is inserted into the mounting pedestal 50, an upper end portion of the head portion 11 is held, and an inclination and rattling of the clip 10 is suppressed.

As described before, the clip 10 is assembled into the mounting seat 53 so that the mounting seat 53 is interposed between the pair of flange portions 15, 17. In this state, while the first flange portion 15 widely abuts an inner face of the mounting seat 53 at the bottom side thereof, the second flange portion 17 partially abuts an outer face of the mounting seat 53 at the upper side thereof.

Explanations will be made into this matter as follows. The inner circumferential projection 60 is formed to protrude from the circumferential edge of the enlarged-diameter hole 55 toward outside the mounting seat 53 in a given height. As shown in FIG. 2, in a state where the mounting seat 53 is interposed between the first flange portion 15 and the second flange portion 17, the most protruding portion of the inner circumferential projection 60 is located on a radial inner side with respect to the top portion 23 of the second flange portion 17, and the most protruding portion abuts the flange radial-inner face 21.

The inner circumferential projection 60 includes a projection radial-inner face (third tapered face) 61 formed to have an inclination that gradually comes close to the second flange portion 17 along the radially inward direction. As shown in FIG. 3, in the assembled state, the inclination angle θ1 of the projection radial-inner face 61 with respect to the surface S2 perpendicular to the axial center S1 of the clip 10 is larger than the inclination angle θ2 of the flange radial-inner face 21 of the second flange portion 17 with respect to the surface S2 perpendicular to the axial center S1 of the clip 10.

A dimensional relation between the mounting seat 53 and the clip 10 is set to satisfy R2−R1>(D2−D1)/2, wherein D1 is an outer diameter of the neck portion 13, D2 is an inner diameter of the enlarged-diameter hole 55, R1 is a distance from the center C2 of the enlarged-diameter hole 55 to the most protruding portion of the inner circumferential projection 60 and R2 is a distance from the axial center C1 of the neck portion 13 to the top portion 23 of the second flange portion 17.

Figure 4:
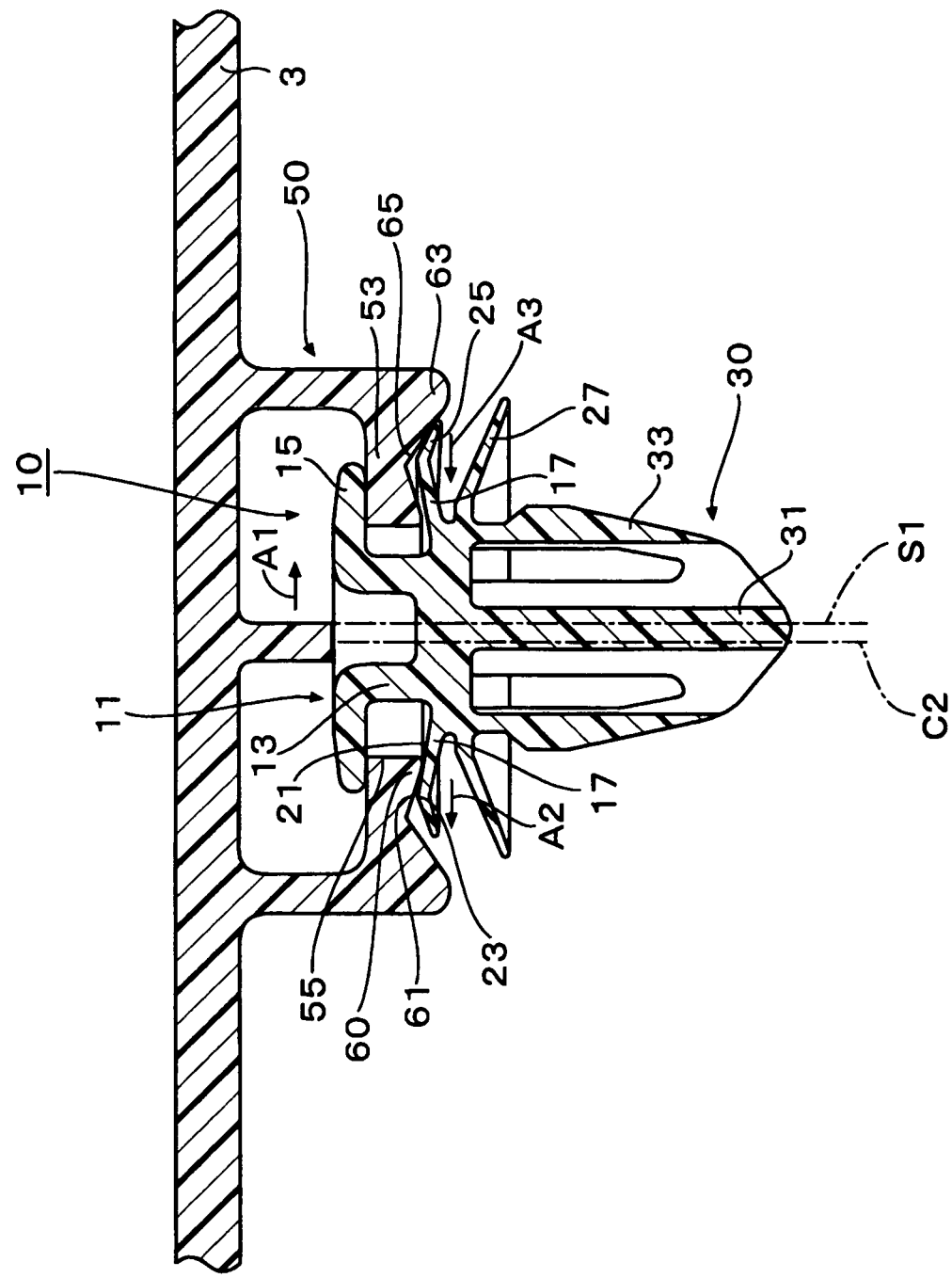
FIG. 4 is a sectional view showing a state in which a clip is not-coaxial by a given distance in the assembling structure of the present invention.

On the outer face side of the mounting seat 53 abutting the second flange portion 17 and further on the outer diameter side of the inner circumferential projection 60, the outer circumferential projection 63 is protruded by a given height. In this embodiment, the outer circumferential projection 63 protrudes higher than the inner circumferential projection 60. The most protruding portion of the outer circumferential projection 63 is positioned on a radial outer side with respect to the top portion 23 of the second flange portion 17. As shown in FIG. 4, when the neck portion 13 is moved inside the enlarged-diameter hole 55 and the axial center S1 of the clip 10 is not-coaxial with the center C2 of the enlarged-diameter hole 55, the outer circumferential projection 63 abuts the flange radial-outer face 25 of the second flange portion 17.

The outer circumferential projection 63 includes a projection radial-outer face (fourth tapered face) 65 formed to have an inclination that gradually comes close to the second flange portion 17 along the radially outward direction. As shown in FIG. 3, in the assembled state, the inclination angle θ3 of the projection radial-outer face 65 with respect to the surface S2 perpendicular to the axial center S1 of the clip 10 is larger than the inclination angle θ4 of the flange radial-outer face 25 of the second flange portion 17 with respect to the surface S2 perpendicular to the axial center S1 of the clip 10.

Next, a procedure to mount the mounting member 3 on the mounted-side member 5 by using the clip 10 will be described.

A plurality of clips 10 are respectively mounted on a plurality of mounting seats 53 provided on the mounting member 3 and the leg portions 30 of the plurality of clips 10 are respectively inserted into a plurality of mounting holes 7 formed in the mounted-side member 5 such as a vehicle body panel. In this way, the mounting member 3 is mounted on the mounted-side member 5 through the clips 10.

The procedure is described as follows. First, the first flange portion 15 of the head portion 11 is aligned with the opening portion of the mounting pedestal 50, and then, the clip 10 is pushed toward the enlarged-diameter hole 55, thereby inserting the neck portion 13 into the enlarged-diameter hole 55 through the introducing groove 57. As a result, the clip 10 is assembled to the plate-like mounting seat 53 in a state where the mounting seat 53 is interposed between the first flange portion 15 and the second flange portion 17 and where the inner circumferential projection 60 of the mounting seat 53 abuts the flange radial-inner face 21 of the second flange portion 17. In the same manner, the other clips 10 are assembled to the other mounting seats 53.

In the assembled state, the leg portions 30 of the plurality of clips 10 are respectively aligned with the plurality of mounting holes 7 formed in the mounted-side member 5 and the mounting member 3 is pushed into the mounted-side member 5. Then, as shown in FIG. 6, the engaging step portion 35 of the engaging piece 33 of each leg portion 30 is engaged with a bottom-side peripheral edge of the mounting hole 7. At the same time, a peripheral edge of the seal flange portion 27 elastically abuts a surface-side peripheral edge of the mounting hole 7. Therefore, the clip 10 is fixed into the mounting hole 7 without any rattling, and the mounting member 3 can be mounted on the mounted-side member 5 through the clip 10.

Since the inner diameter D2 of the enlarged-diameter hole 55 is larger than the outer diameter D1 of the neck portion 13, the clip 10 is allowed to be displaced inside the enlarged-diameter hole 55 by the maximum length D2−D1. Here, if the clips are displaced inside the enlarged-diameter hole 55 in the various directions, it is difficult to align the leg portions 30 of the clips 10 respectively with the mounting holes 7.

As shown in FIG. 4, in this assembling structure, when an external force acts on the clip 10 and the axial center S1 of the clip 10 is displaced in the direction of the arrow A1 with respect to the center C2 of the enlarged-diameter hole 55, the inner circumferential projection 60 of the mounting seat 53 pressingly abuts the flange radial-inner face 21 of the second flange portion 17 in the direction opposite to the displacement direction. As a result, a pushing force shown by the arrow A2 in the drawing acts on the flange radial-inner face 21 by an elastic force of the second flange portion 17. On the other hand, a peripheral edge of the flange radial-outer face 25 of the second flange portion 17 in the displacement direction pressingly abuts the projection radial-outer face 65 of the outer circumferential projection 63 of the mounting seat 53. As a result, a pushing force shown by the arrow A3 acts on the projection radial-outer face 65 by an elastic force of the second flange portion 17. The pushing forces A2, A3 acts as a centering force that moves the axial center S1 of the clip 10 toward the center C2 of the enlarged-diameter hole 55. Therefore, the correction is made so that the axial center S1 of the clip 10 can be positioned at the center C2 of the enlarged-diameter hole 55. Since the axial center S1 of each clip 10 can be positioned at the center C2 of the enlarged-diameter hole 55 in this way, the leg portions 30 of the clips 10 mounted on a plurality of mounting pedestals 50 can be easily aligned with the corresponding mounting holes 7 formed in the mounted-side member 5.

In this embodiment, the mounting seat 53 has the inner circumferential projection 60 that abuts the flange radial-inner face 21 is arranged in the mounting seat 53 in a regular state and the outer circumferential projection 63 that abuts the flange radial-outer face 25 in a state where the clip 10 is not-coaxial with the center C2 of the enlarged-diameter hole 55, is also arranged in the mounting seat 53. Accordingly, when the clip 10 is not-coaxial with the center C2 of the enlarged-diameter hole 55, two pushing forces A2, A3 act on the clip 10, and the centering force can be more enhanced.

Further, the projection radial-inner face 61 is provided in the inner circumferential projection 60 and the projection radial-outer face 65 is provided in the outer circumferential projection 63. When the clip 10 is not-coaxial with the center C2 of the enlarged-diameter hole 55, the flange radial-inner face 21 abuts the projection radial-inner face 61 and the flange radial-outer face 25 abuts the projection radial-outer face 65. Since the corresponding inclination faces abut each other, the centering force is effectively given to the clip 10.

As shown in FIG. 3, the inclination angle θ1 of the projection radial-inner face 61 with respect to the face S2 perpendicular to the axial center S1 of the clip 10 is larger than the inclination angle θ2 of the flange radial-inner face 21 with respect to the face S2. Further, the inclination angle θ3 of the projection radial-outer face 65 with respect to the face S2 described before is larger than the inclination angle θ4 of the flange radial-outer face 25 with respect to the face S2. That is, the projection radial-inner face 61 is steeper than the flange radial-inner face 21, and the projection radial-outer face 65 is steeper than the flange radial-outer face 25. As a result, when the clip 10 is not-coaxial with the center C2 of the enlarged-diameter hole 55, the inner circumferential projection 60 and the outer circumferential projection 63 respectively surely abut the flange radial-inner face 21 and the flange radial-outer face 25, thereby enhancing the centering force.

As shown in FIG. 2, in a state where the clip 10 is assembled to the mounting seat 53, the inner circumferential projection 60 of the mounting seat 53 only abuts the flange radial-inner face 21. Therefore, the deformation of the second flange portion 17 can be suppressed at the minimum and a permanent deformation is seldom caused. Therefore, there is no possibility that the centering force is lowered even in the case where the mounting member 3 is stored in a state where the clip 10 is mounted on the mounting seat 53 before the mounting member 3 is mounted on the mounted-side member 5, and centering of the clip 10 can be surely executed when the mounting member 3 is mounted on the mounted-side member 5.

For example, a dimensional error may occur between the mounting member 3 and the mounted-side member 5. In this case, when the plurality of clips 10 are mounted on the plurality of mounting seats 53 provided in the mounting member 3, although the clips 10 are respectively located at the centers C2 of the enlarged-diameter holes 55 by the above-mentioned centering forces, the leg portions 30 of the clips 10 may not be aligned accurately with the centers of the mounting holes 7. However, since the neck portions 13 is allowed to be moved inside the enlarged-diameter holes 55, the clips 10 can be moved resisting the centering forces to align the leg portions 30 with the mounting holes 7 and to absorb the above dimensional error.

Figure 5:
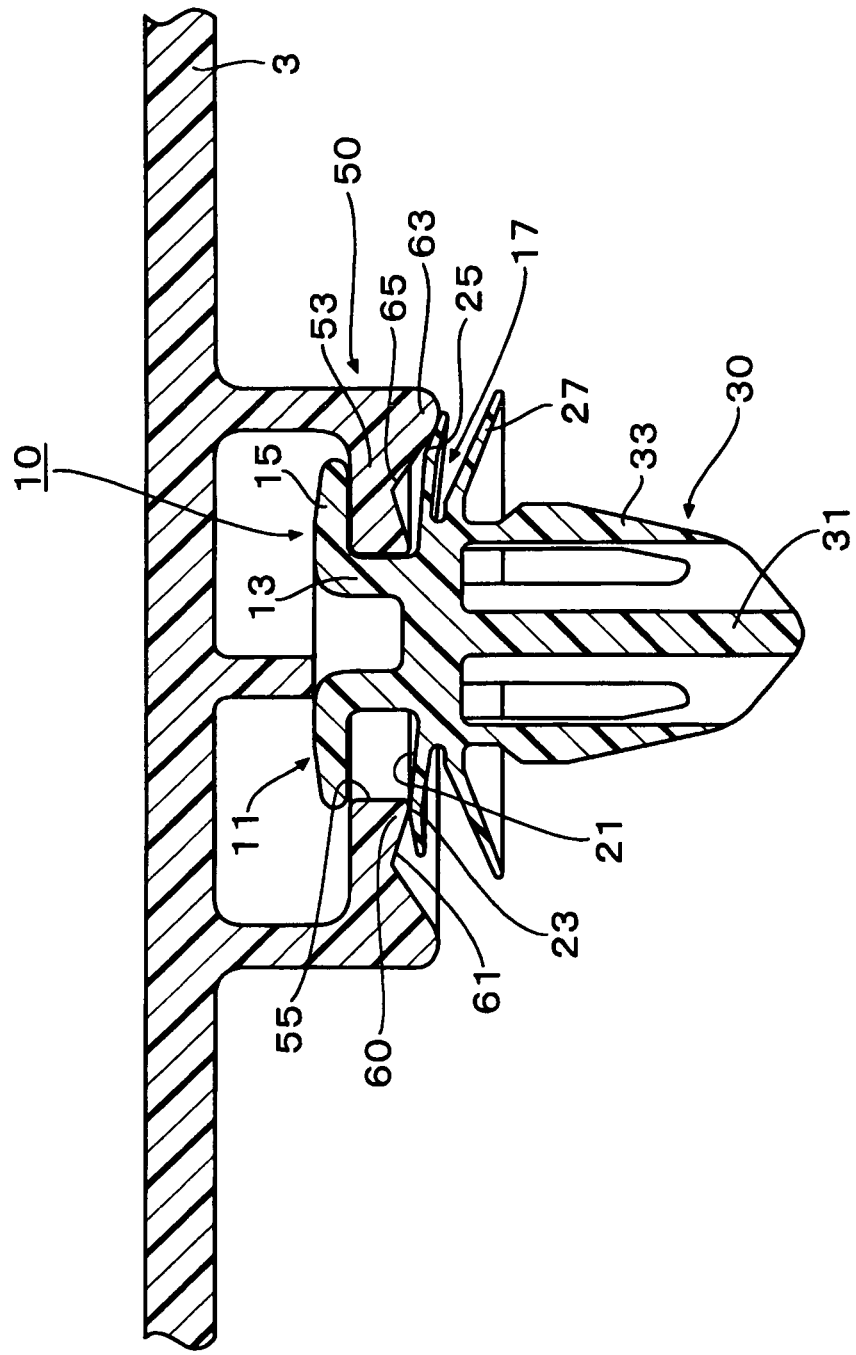
FIG. 5 is a sectional view showing a state in which a clip is not-coaxial at the maximum in the assembling structure.

As described before, a dimensional relation is set to satisfy R2−R1>(D2−D1)/2, wherein D1 is an outer diameter of the neck portion 13, D2 is an inner diameter of the enlarged-diameter hole 55, R1 is a distance from the center C2 of the enlarged-diameter hole 55 to the most protruding portion of the inner circumferential projection 60 and R2 is a distance from the axial center C1 of the neck portion 13 to the top portion 23 of the second flange portion 17. For example, as shown in FIG. 5, even when the clip 10 is displaced in such a manner that the neck portion 13 is moved at the maximum in the enlarged-diameter hole 55, the top portion 23 of the second flange portion 17 is prevented from exceeding the inner circumferential projection 60 of the mounting seat 53. Accordingly, the centering force can be surely given to the clip 10 while the flange radial-inner face 21 is surely abutting the inner circumferential projection 60.

Figure 7:
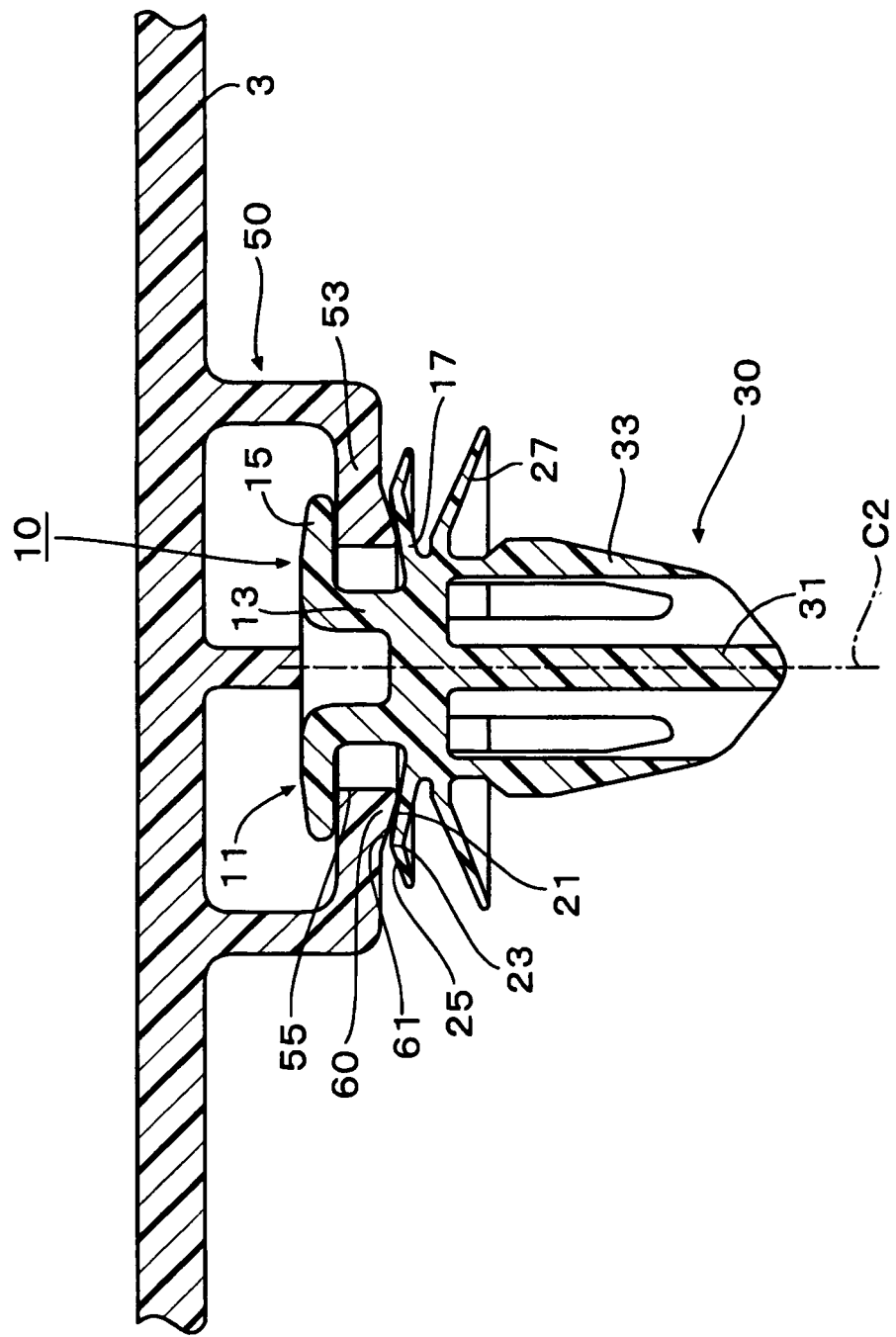
FIG. 7 is a sectional view showing an assembling structure of a clip and a mounting member according to another embodiment of the present invention.

FIG. 7 is a view showing an assembling structure according to another embodiment of the present invention. Like reference marks are used to indicate like parts in this embodiment and the embodiment described before. The redundant explanations are omitted here.

This embodiment is different from the foregoing embodiment in the shape of the mounting seat 53. In the mounting seat 53 of this embodiment, only the inner circumferential projection 60 is provided on the outside and the outer circumferential projection 63 is not provided.

In this embodiment, when the clip 10 is not-coaxial with the center C2 of the enlarged-diameter hole 55, the inner circumferential projection 60 is pushed by the flange radial-inner face 21. Therefore, a centering force acts on the clip 10 by an elastic force generated on the flange radial-inner face 21, and the clip 10 can be arranged at the center C2 of the enlarged-diameter hole 55.

Figure 8:
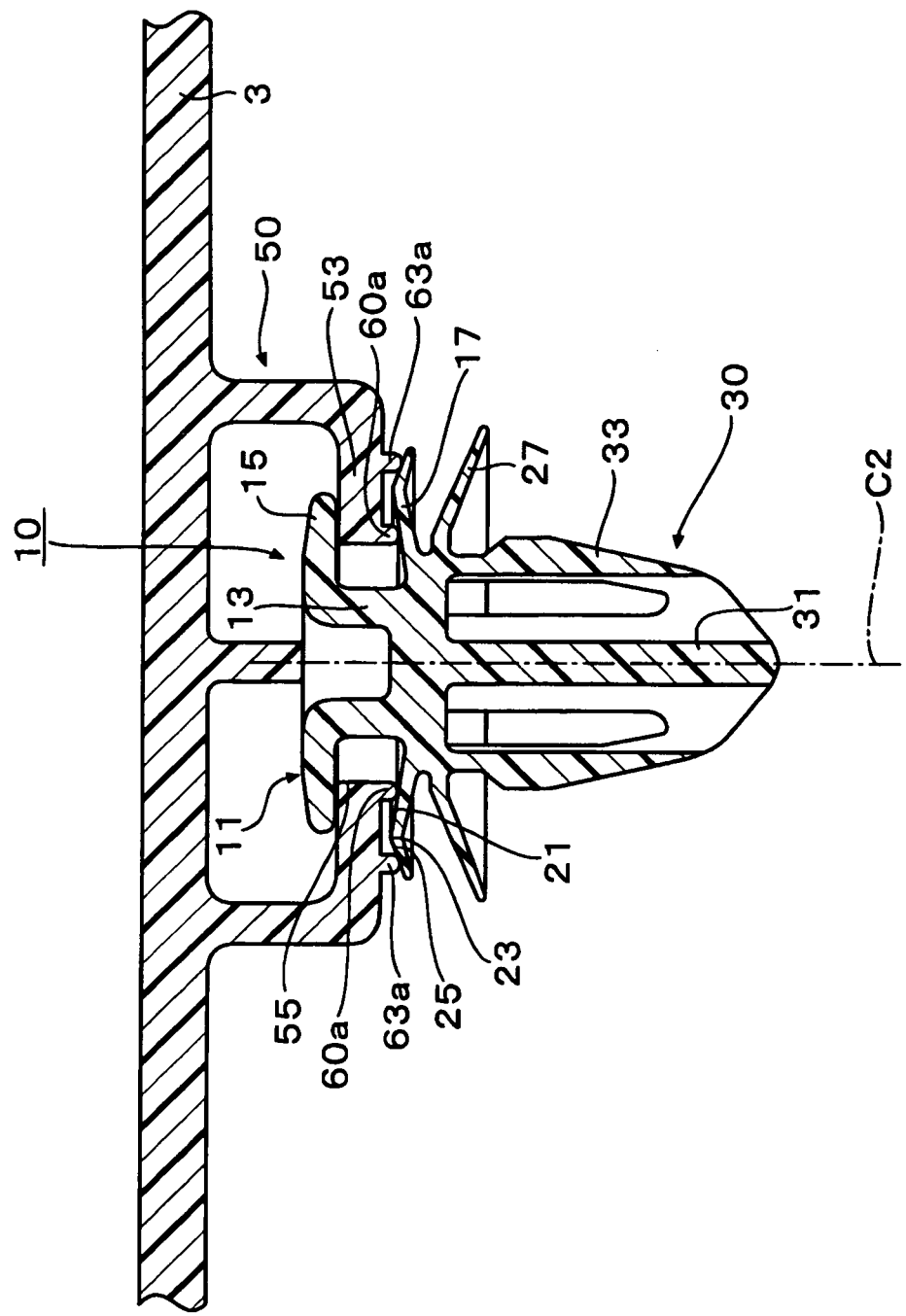
FIG. 8 is a sectional view showing an assembling structure of a clip and a mounting member according to still another aspect of the present invention.

FIG. 8 is a view showing an assembling structure according to still another embodiment of the present invention. Like reference marks are used to indicate like parts in this embodiment and the embodiment described before. The redundant explanations are omitted here.

In this embodiment, shapes of the inner circumferential projection 60 and the outer circumferential projection 63 are different from those shown in FIGS. 1 to 6. That is, the inner circumferential projection 60a is formed into an annular-rib-shape protruded from the outside circumferential edge of the enlarged-diameter hole 55 to have a given height. In addition, the outer circumferential projection 63a is formed into an annular-rib-shape concentrically protruded radial outside the inner circumferential projection 60a.

In this embodiment, when the clip 10 is not-coaxial with the center C2 of the enlarged-diameter hole 55, the inner circumferential projection 60a and the outer circumferential projection 63a respectively push the flange radial-inner face 21 and the flange radial-outer face 25. As a result, the centering action can be made so that the clip 10 is aligned with the center C2 of the enlarged-diameter hole 55 by elastic forces respectively acting on the flange radial-inner face 21 and the flange radial-outer face 25.

In the assembling structures according to the embodiments, when the neck portion is not co-axial with the enlarged-diameter hole center in a state where the clip is assembled to the mounting seat, the inner circumferential projection of the mounting seat is strongly pushed by the flange radial-inner face on the opposite side to the eccentric direction. A centering force pushing the clip onto the opposite side to the eccentric direction acts by an elastic force of the flange radial-inner face, and the clip is arranged at the center of the enlarged-diameter hole. As a result, when the leg portions of the respective clips are inserted into the corresponding mounting holes of the mounted-side member, the leg portions can be easily positioned with respect to the mounting holes, thereby enhancing the working property of mounting. In the assembling state, the inner circumferential projection of the mounting seat only abuts the flange radial-inner face of the second flange portion. Therefore, the deformation of the two flange portions can be suppressed at the minimum and a permanent deformation is seldom caused. Accordingly, the centering force can be prevented from being lowered.

In the aforementioned embodiments, the inner circumferential projection and the outer circumferential projection are formed in a ring-like shape. However, a plurality of projections concyclically arranged along the ring-like shape may be provided.

What is claimed is:

1. An assembling structure comprising:
   a mounting member including:
   a mounting seat; and
   a clip including:
   a head portion that is to be inserted into the mounting seat; and
   a leg portion that extends from one surface of the head portion and that is to be inserted into a mounted-side member,
   wherein the head portion includes;
   a neck portion that is to be inserted into the mounting seat;
   a first flange portion that outwardly protrudes from an upper-side circumference of the neck portion so that a lower face thereof abuts the mounting seat; and a second flange portion that outwardly protrudes from a lower-side circumference of the neck portion so that an upper face thereof abuts the mounting seat, wherein the mounting seat includes:
an enlarged-diameter hole that has an inner diameter larger than an outer diameter of the neck portion;
an introducing groove formed to communicate the enlarged-diameter hole with an outer peripheral of the mounting seat; and
an inner projection that is formed such that portions of the inner projection disposed on opposite sides of a center axis of the enlarged-diameter hole downwardly protrude in an axial direction of the neck portion along a peripheral edge of the enlarged-diameter hole, wherein the upper face of the second flange portion includes:
a first tapered face that radially-outwardly extends from the neck portion and is inclined such that portions of the first tapered face disposed on opposite sides of a center axis extending through the neck portion gradually extend toward the first flange portion as the first tapered face extends radially outward;
a top portion that is continuous with the first tapered face and is closest to the first flange portion; and
a second tapered face that radially-outwardly extends from the top portion and is inclined to gradually separate from the first flange portion, wherein the first tapered face abuts the inner projection in an assembled state in which the clip is assembled on the mounting seat, and wherein the inner projection includes a third tapered face inclined to gradually come close to the second flange portion along a radially inward direction.

2. An assembling structure comprising:
a mounting member including:
a mounting seat; and
a dip including:
a head portion that is to be inserted into the mounting seat; and
a leg portion that extends from one surface of the head portion and that is to be inserted into a mounted-side member, wherein the head portion includes:
a neck portion that is to be inserted into the mounting seat;
a first flange portion that outwardly protrudes from an upper-side circumference of the neck portion so that a lower face thereof abuts the mounting seat; and
a second flange portion that outwardly protrudes from a lower-side circumference of the neck portion so that an upper face thereof abuts the mounting seat, wherein the mounting seat includes:
an enlarged-diameter hole that has an inner diameter larger than an outer diameter of the neck portion;
an introducing groove formed to communicate the enlarged-diameter hole with an outer peripheral of the mounting seat; and
an inner projection that is formed such that portions of the inner projection disposed on opposite sides of a center axis of the enlarged-diameter hole downwardly protrude in an axial direction of the neck portion along a peripheral edge of the enlarged-diameter hole, wherein the upper face of the second flange portion includes:
a first tapered face that radially-outwardly extends from the neck portion and is inclined such that portions of the first tapered face disposed on opposite sides of a center axis extending through the neck portion gradually extend toward the first flange portion as the first tapered face extends radially outward;
a top portion that is continuous with the first tapered face and is closest to the first flange portion; and
a second tapered face that radially-outwardly extends from the top portion and is inclined to gradually separate from the first flange portion, wherein the first tapered face abuts the inner projection in an assembled state in which the clip is assembled on the mounting seat, wherein the inner projection includes a third tapered face inclined to gradually come close to the second flange portion along a radially inward direction, and wherein, in the assembled state, an inclination angle of the third tapered face against a plane perpendicular to a center axis of the clip is larger than an inclination angle of the first tapered face against the plane.

3. The assembling structure according to claim 1, wherein a relation that $R2-R1>(D2-D1)/2$ is satisfied, where D1 is the outer diameter of the neck portion, D2 is the inner diameter of the enlarged-diameter hole, R1 is a distance from a center of the enlarged-diameter hole to a most protruding portion of the inner projection, and R2 is a distance from an axial center of the neck portion to the top portion of the second flange portion.

4. The assembling structure according to claim 1, wherein the mounting seat further includes an outer projection that is positioned radially-outward the inner projection, and
wherein the outer projection is formed to abut the second tapered face in a state where the clip is not coaxial with a center of the enlarged-diameter hole.

5. The assembling structure according to claim 4, wherein the outer projection includes a fourth tapered face inclined to gradually come close the second flange portion along a radially outward direction.

6. The assembling structure according to claim 5, wherein, in the assembled state, an inclination angle of the fourth tapered face against a plane perpendicular to a center axis of the clip is larger than an inclination angle of the second tapered face against the plane.

7. The assembling structure according to claim 5, wherein the fourth tapered face extends axially away from the first flange portion as the fourth tapered face extends radially outward.

8. The assembling structure according to claim 1, wherein the second tapered face is disposed radially outward of the first tapered face.

9. The assembling structure according to claim 5, wherein the fourth tapered face and the third tapered face together to form a V-shape.

10. The assembling structure according to claim 1, wherein the first tapered face is inclined so as to gradually extend toward the lower face of first flange portion as the first tapered face extends radially outward.

11. The assembling structure according to claim 1, wherein the second tapered face extends from the top portion and is inclined so as to gradually extend away from the first flange portion as the second tapered face extends radially outward.

12. The assembling structure according to claim 1, wherein the inner projection is uniformly formed along the peripheral edge of the enlarged-diameter hole to downwardly project in the axial direction of the neck portion.

13. The assembling structure according to claim 1, wherein the inner projection is formed such that, in the assembled state, a gap is formed between the top portion and the mounting seat in the axial direction of the neck portion.

14. The assembling structure according to claim 1, wherein the inner projection is formed to downwardly protrude in the axial direction of the neck portion along an entirety of a peripheral edge of the enlarged-diameter hole, and wherein the first tapered face radially-outwardly extends from the neck portion and is inclined such that an entire circumference of the first tapered face gradually extends toward the first flange portion as the first tapered face extends radially outward.

15. The assembling structure according to claim 1, wherein the inner projection is formed such that, in the assembled state where the neck portion is radially centered in the enlarged-diameter hole, a gap is formed between the top portion and the mounting seat in the axial direction of the neck portion.

16. The assembling structure according to claim 1, wherein the inner projection is uniformly formed around a circumference of the peripheral edge of the enlarged-diameter hole to downwardly project in the axial direction of the neck portion.

17. The assembling structure according to claim 1, wherein the portions of the inner projection disposed on opposite sides of the center axis of the enlarged-diameter hole form a ring shape as viewed in the center axis of the enlarged-diameter hole, and wherein portions of the first tapered face disposed on the opposite sides of the center axis extending through the neck portion form a ring shape as viewed in the center axis extending through the neck portion.

\* \* \* \* \*